US012578064B2

(12) United States Patent
Rebernik

(10) Patent No.: US 12,578,064 B2
(45) Date of Patent: Mar. 17, 2026

(54) SAFETY WITHDRAWAL SYSTEM FOR A CRYOGENIC CONTAINER

(71) Applicants: Cryoshelter LH2 GmbH, Dobl-Zwaring (AT); Cryoshelter BioLNG GmbH, Dobl-Zwaring (AT)

(72) Inventor: Matthias Rebernik, Dobl-Zwaring (AT)

(73) Assignees: CRYOSHELTER LH2 GMBH, Dobl-Zwaring (AT); CRYOSHELTER BIOLNG GMBH, Dobl-Zwaring (AT)

(*) Notice: Subject to any disclaimer, the term of this patent is extended or adjusted under 35 U.S.C. 154(b) by 280 days.

(21) Appl. No.: 18/246,653

(22) PCT Filed: Sep. 24, 2021

(86) PCT No.: PCT/AT2021/060346
§ 371 (c)(1),
(2) Date: Mar. 24, 2023

(87) PCT Pub. No.: WO2022/067362
PCT Pub. Date: Apr. 7, 2022

(65) Prior Publication Data

US 2023/0366515 A1 Nov. 16, 2023

(30) Foreign Application Priority Data

Sep. 29, 2020 (AT) .............................. A 50190/2020

(51) Int. Cl.
*F17C 13/12* (2006.01)
*F17C 13/04* (2006.01)

(52) U.S. Cl.
CPC ............ *F17C 13/123* (2013.01); *F17C 13/04* (2013.01); *F17C 2205/0329* (2013.01);
(Continued)

(58) Field of Classification Search
None
See application file for complete search history.

(56) References Cited

U.S. PATENT DOCUMENTS

2014/0251479 A1 9/2014 Gibb
2019/0383236 A1 12/2019 Garner

FOREIGN PATENT DOCUMENTS

CA 2653643 A1 * 5/2009 ........... F02D 19/022
CA 2653643 C * 8/2010 ........... F02D 19/022
(Continued)

OTHER PUBLICATIONS

EP3236133A1 English Machine Translation (Year: 2017).*
(Continued)

*Primary Examiner* — Jenna M Maroney
(74) *Attorney, Agent, or Firm* — Workman Nydegger

(57) ABSTRACT

One example of a safety withdrawal system includes a cryogenic container, a withdrawal line and an economizer situated between the withdrawal line and the cryogenic container for withdrawing cryogenic fluid in liquid phase and gas phase, and the economizer is configured as an electric economizer having two controllable valves that are respectively currentless closed, which each may block the withdrawal of the liquid phase or the gas phase from the cryogenic container. The safety withdrawal system further includes an emergency stop off-switch that may be manually actuated, which is connected to the two currentless closed valves of the electric economizer and is configured to simultaneously block the withdrawal of cryogenic fluid by both valves upon actuation.

12 Claims, 1 Drawing Sheet

(52) U.S. Cl.

CPC ................. *F17C 2205/0332* (2013.01); *F17C 2205/0335* (2013.01); *F17C 2221/012* (2013.01); *F17C 2221/033* (2013.01); *F17C 2223/0161* (2013.01); *F17C 2250/036* (2013.01); *F17C 2250/043* (2013.01); *F17C 2250/0439* (2013.01); *F17C 2250/0482* (2013.01); *F17C 2260/04* (2013.01); *F17C 2270/0168* (2013.01); *F17C 2270/0184* (2013.01)

(56) References Cited

FOREIGN PATENT DOCUMENTS

| | | | | | |
|---|---|---|---|---|---|
| CN | 110131581 | A | * | 8/2019 | F17C 13/02 |
| CN | 110462278 | B | * | 5/2021 | F17C 9/02 |
| DE | 202009014307 | U1 | * | 3/2011 | F17C 13/005 |
| DE | 102015218233 | A1 | * | 3/2017 | B60K 15/03006 |
| DE | 102017208807 | A1 | | 11/2018 | |
| DE | 102019129725 | A1 | | 5/2020 | |
| EP | 1760390 | A2 | * | 3/2007 | F17C 13/02 |
| EP | 3236132 | A1 | * | 10/2017 | F17C 9/02 |
| EP | 3236133 | A1 | * | 10/2017 | F17C 9/02 |
| EP | 3489061 | A1 | | 5/2019 | |
| EP | 3961083 | A1 | * | 3/2022 | F17C 7/02 |
| WO | WO-2013091109 | A1 | * | 6/2013 | B60K 15/07 |
| WO | WO-2015144359 | A1 | * | 10/2015 | F16K 31/025 |
| WO | WO-2016172803 | A1 | * | 11/2016 | F02M 21/0212 |
| WO | WO-2018093307 | A1 | * | 5/2018 | B60K 15/03006 |
| WO | WO-2018162790 | A1 | * | 9/2018 | F17C 9/02 |

OTHER PUBLICATIONS

EP3489061A1 English Machine Translation (Year: 2019).*

International Search Report and Written Opinion, mailed Jan. 4, 2022, from PCT/AT2021/060346.

* cited by examiner

SAFETY WITHDRAWAL SYSTEM FOR A CRYOGENIC CONTAINER

BACKGROUND OF THE INVENTION

1. The Field of the Invention

The invention relates to a safety withdrawal system, comprising a cryogenic container, a withdrawal line and an economizer situated between the withdrawal line and the cryogenic container for withdrawing cryogenic fluid in liquid phase and in gas phase.

2. The Relevant Technology

According to prior art, liquefied gases may be stored in containers ("cryogenic containers") to store these as a fuel for, for example, a motor. Liquefied gases are gases that are present at boiling temperature in the liquid state of aggregation, wherein the boiling temperature of this fluid is dependent on pressure. If such a cryogenic liquid is filled into a cryogenic container, a pressure corresponding to the boiling temperature will establish, apart from the thermal interactions with the cryogenic container itself.

Form prior art there is further known to provide mechanic economizers for withdrawing cryogenic fluid from the cryogenic container, such as described in the EP 3 489 062 A1, for example. Such economizers are connected to the cryogenic container by way of two connection lines, one of which withdrawing a cryogenic fluid in the liquid phase and the other cryogenic fluid in the gas phase from the cryogenic container. By means of mechanic valves in the two connection lines, the economizer may control the ratio of liquid phase withdrawn to gas phase withdrawn. For example, in a normal case, liquid phase may be withdrawn from the cryogenic container and supplied to the motor, wherein gas phase will only then be withdrawn from the cryogenic container and then supplied to the motor if the pressure within the cryogenic container exceeds a threshold value. In this way, the pressure within the cryogenic container may be economically and environmentally-friendly reduced, without simply discharging gas from the cryogenic container for the reduction of pressure.

Further economizers, for example, are known from the publications WO2016172803A1, U.S. Pat. No. 4,406,129A, US2017159611A1 and DE102019129725A1.

BRIEF SUMMARY OF AN EXAMPLE EMBODIMENT

It will be appreciated that due to the high pressures within the cryogenic container, there will be a demand to provide special safety measures. For this reason, there are provided in prior art, for example, two additional valves in the withdrawal line downstream of the mechanic economizer. The first valve directly following the mechanic economizer is a manually actuatable valve, which may be accessed, for example, immediately next to the cryogenic container. Such manually actuatable valves are demanded in prior art such that a user may interrupt the connection of the cryogenic container to the motor immediately if this detects a problem such as excess pressure.

Furthermore, there is arranged within the withdrawal line a currentless closed valve that is controlled by a motor ignition such that the withdrawal line will be permanently closed if it is not controlled by the ignition.

This system has proven itself in practice, however, it will take up huge installation space at the side of the vehicle. Simply omitting one of the two valves would reduce the required space for the fittings but will, however, simultaneously lead to a reduction of the safety level.

It is, hence, the task of the invention to reduce the required space requirement for the safety fittings and simultaneously to ensure a safety level of at least the same height.

This task is solved by a safety withdrawal system, comprising a cryogenic container, a withdrawal line and an economizer situated between the withdrawal line and the cryogen container for withdrawing cryogenic fluid in liquid phase and in gas phase, wherein the economizer is configured as an electric economizer having two controllable and currentless closed valves, which each may block the withdrawal of the liquid phase or the gas phase from the cryogenic container and wherein the system further comprises an emergency stop switch, which is connected to the two currentless closed valves of the electric economizer and is configured to block the withdrawal by both valves simultaneously upon actuation, wherein the emergency stop switch is a manually actuatable emergency stop switch and/or wherein the safety withdrawal system further comprises a control united connected to the emergency stop switch and is configured to detect an accident and to actuate the emergency stop switch upon detection of an accident.

The invention consist of omitting the manually actuatable valve in the withdrawal line and instead creating a novel manual or automatic, respectively, withdrawal stop in the case of emergencies. For this purpose, the economizer that is usually not associated with safety functions was modified such that this may also assume a blocking function that may be manually added or is actuated automatically upon detection of an accident. In order to block the withdrawal of cryogenic fluid from the cryogenic container in a manual way or automatically upon detection of an accident, respectively, there will be provided a newly designed emergency stop switch, which stops the withdrawal of cryogenic fluid through the withdrawal line by closing the valves of the economizer that are configured as currentless closed upon actuation.

In this way, there have to be arranged fewer structural components in the withdrawal line, which is why the required space will be reduced. The safety level of the inventive system, however, will be kept the same, as the valves of the electric economizer may fulfil additional safety functions due to their configuration as currentless closed valves.

A huge advantage of the present invention is in addition that the two valves of the economizer are blocked simultaneously and that not only one of the valves is blocked due to human or technical failure.

In a preferred embodiment the safety withdrawal system comprises a currentless closed valve, which is controlled by a motor ignition, in the withdrawal line, wherein the emergency stop switch is connected to the valve controlled by the motor ignition as well as the two currentless closed valves of the electric economizer and is configured to simultaneously block the withdrawal of cryogenic fluid by all three valves upon actuation. In this way, the safety level may be even further increased as the manual or automatic, respective, closing of the withdrawal line is realized redundantly.

In a preferred embodiment of the invention the emergency stop switch is arranged at the cryogenic container or within a driver's cabin. Alternatively, the emergency stop switch may be arranged immediately next to a filling coupling or a pressure indicator. If the emergency stop switch mentioned firstly is not arranged within the driver's cabin, there may be preferably provided a further emergency stop switch that is preferably arranged within the driver's cabin, which is connected to the valve controlled by the motor ignition and the two currentless closed valves of the electric economizer and is configured to block the withdrawal by all three valves upon actuation.

In a further preferred embodiment the safety withdrawal system comprises a connection line to a further cryogenic container, which connects at the withdrawal line downstream of the currentless closed valve in a node, and a check valve, which is arranged downstream of the electric economizer and upstream of the node and prevents the flow of cryogenic fluid in the direction of the cryogenic container. By the blocking of the currentless closed valves of the electric economizer and the currentless closed valve of the motor ignition, as described above, there may be achieved, as already described above, a redundancy for blocking the withdrawal of cryogenic fluid in the direction of the motor. If, however, the withdrawal lines of two cryogenic containers are connected via the connection line, this may lead to a negative differential pressure, i.e., the pressure within the withdrawal line is higher than in the cryogenic container. If this negative differential pressure becomes too high, this may, upon failure of the valve also controlled by the motor ignition, press open the valves of the electric economizer closed by the emergency off-switch, in particular if these are configured as pressure relief valves. In order to create complete redundancy in both directions of the withdrawal line, there is arranged, as initially described, a check valve within the withdrawal line.

The control unit is especially preferably configured to detect an accident by receiving a respective control signal of a vehicle electronics and/or by receiving a respective sensor signal of a sensor connected to the control unit. Accident is understood as a general technical failure of the vehicle, on which the cryogenic container having the withdrawal system is mounted. The control signal of the vehicle electronics may, for example, be a measurement value, which may suggest a vehicle fire or an imminent vehicle fire (temperature signal) or overheating of components in the critical environment of the tank system. It will be appreciated, however, that modern vehicle electronics may perform accidents or technical failures, respectively, in particular also by complex analyses such that the choice of the control signal is to be understood as not being limited.

The control unit, however, need not receive a control signal from a vehicle electronics but may rather detect an accident in an autarkic way. In this case, the sensor connected to the control unit may, for example, be an acceleration sensor, a temperature sensor for determining the ambient temperature or a pressure sensor for determining an internal pressure of the cryogenic container and an accident will be detected if a value measured by the sensor exceeds a predetermined threshold value or drops below.

In addition, the control unit may be configured to detect an operational mode of a vehicle (i.e. of the vehicle the safety withdrawal system is mounted on) and only then enable the withdrawal of cryogenic fluid if the vehicle is being operated and/or if a safe withdrawal of cryogenic fluid is ensured. The control unit may, hence, keep the valves of the economizer regularly closed and may only then clear a passage for the cryogenic fluid if the vehicle is being operated, which means that the control unit receives a respective control signal from a vehicle electronics. Alternatively or additionally, the control unit may only then clear a passage for cryogenic fluid if a safe withdrawal of cryogenic fluid is ensured, which is to be understood herein as that the control unit receives measurement data (e.g. internal temperature of the cryogenic container, internal pressure of the cryogenic container, motor temperature and/or ready-for-operation signal of the vehicle electronics) from at least one sensor and, following a threshold value comparison, recognizes that no safety concerns are existent during the withdrawal of cryogenic fluid.

Another embodiment provides that two cryogenic containers each having a withdrawal system of its own are mounted on the vehicle, which may be the case on a regular basis if there is mounted one cryogenic container on the left side at the vehicle frame and one cryogenic container is mounted on the right side at the vehicle frame, viewed in the travel direction. One of the cryogenic containers could, for example, also be arranged behind the driver's cabin or on the roof. There could also be provided more than two cryogenic containers, which could be mounted at the locations mentioned. In these cases there has been provided so far that there is provided an individual valve that is manually actuatable in the respective withdrawal line for each of the cryogenic containers. In the case of an emergency, the user would have to walk around the vehicle to manually close both valves and to prevent the withdrawal of cryogenic fluid from both cryogenic containers. According to the invention there is now provided that the safety withdrawal system mentioned be doubled wherein the emergency stop switch may close all valves of both economizers. Due to a single actuation, the emergency stop switch may not only prevent the withdrawal at the nearest cryogenic container but also the withdrawal from the cryogenic container at the opposite vehicle side. There may also be provided two such emergency stop switches, wherein one is arranged on the one vehicle side and the other on the other vehicle side. Optionally, there may also be attached an additional emergency stop switch within the driver's cabin or externally at the driver's cabin. Regardless of which vehicle side the user is on, he may stop the respective withdrawal from both cryogenic containers, without having to pass a long way.

In the last-mentioned embodiment, the safety withdrawal system may further comprise currentless closed valves, which are controlled by a motor ignition, in the withdrawal line and in the further withdrawal line, wherein the emergency stop switch is connected to both valves controlled by the motor ignition as well as the four currentless closed valves of the electric economizers and is configured to simultaneously block the withdrawal of cryogenic fluid by all six valves upon actuation.

In further aspects the invention relates to a vehicle, on which there is mounted the safety withdrawal system according to any of the embodiments mentioned above, wherein the cryogenic container is preferably mounted on a vehicle frame laterally at the vehicle. The vehicle preferably has a driver's cabin, and the cryogenic container is arranged behind the driver's cabin, as, for example, already described, laterally at the vehicle on the vehicle frame or centrally at the vehicle immediately behind the driver's cabin. The cryogenic container could also be mounted on the vehicle roof.

BRIEF DESCRIPTION OF THE DRAWINGS

Advantageous and non-limiting embodiments of the invention are explained in greater detail by way of the drawings.

DETAILED DESCRIPTION

Figure 1:
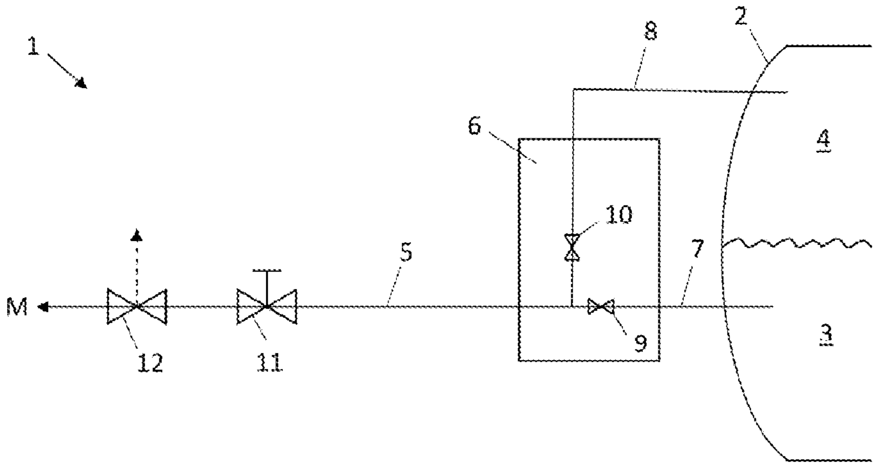
Fig. 1 (Prior Art)
FIG. 1 shows a safety withdrawal system for a cryogenic container according to prior art.

FIG. 1 shows a safety withdrawal system 1 according to prior art, comprising a cryogenic container 2 for storing cryogenic fluid 3. The cryogenic container 2 is usually installed in a vehicle, in particular a freight vehicle and serves as a fuel tank. The cryogenic fluid stored in the cryogenic container 2 may thus be used as fuel. The cryogenic fluid, for example LNG (Liquid Natural Gas), is present in the cryogenic container 2 in a liquid phase 3 as well as a gas phase 4. The cryogenic fluid stored in the cryogenic container may then be supplied to a motor M not depicted in detail via a withdrawal line 5.

In the application according to the invention, the cryogenic fluid could also be, for example, hydrogen such that the cryogenic container 2 is a hydrogen container, or the cryogenic fluid may, as already mentioned, be LNG (Liquefied Natural Gas) such that the cryogenic container is an LNG container. Depending on the cryogenic fluid, the cryogenic container is hence adapted to store cryogenic fluid at temperatures of, for example, 150 Kelvin, in the case of hydrogen even of lower than 50 Kelvin or lower than essentially 20 Kelvin. Depending on the application, the cryogenic container 2 could, for example, be adapted for the storage of sLH2 (subcooled liquid hydrogen) or CcH2 (cryo-compressed hydrogen) and, hence, adapted for correspondingly high pressures, e.g., for maximum pressures of between 5 bar and 350 bar. If the cryogenic fluid is hydrogen, the motor M may also be configured as a fuel cell. In general, the motor could thus be also designated as a load.

For the withdrawal of the cryogenic fluid from the cryogenic container 2, the safety withdrawal system 1 has a mechanic economizer 6 arranged between the cryogenic container 2 and the withdrawal line 5. The mechanic economizer 6 leads, via two connection lines 7, 8, to the cryogenic container 2 to withdraw cryogenic fluid in the liquid phase 3 using the first connection line 7 and cryogenic fluid in the gas phase 4 using the second connection line 8.

The mechanic economizer 6 has a first valve 9 within the first connection line 7 in order to regulate the amount of withdrawal of cryogenic fluid in the liquid phase and a second valve 10 within the second connection line 8 in order to regulate the amount of withdrawal of cryogenic fluid in the gas phase 4. In the simplest case, there may be used a rigid throttle instead of the first valve 9, and the second valve 10 may also be configured as a simple pressure relief valve, which is initiated at a predetermined pressure within the connection line 8 in regard to the atmospheric pressure. In another embodiment, the mechanic economizer 6 may have a control device connected to the valves 9, 10 for adjusting the ratio between liquid phase withdrawn and gas phase withdrawn, which is, for this purpose, connected to various measurement sensors. The mechanic economizer 6 is a closed system, which will not be manipulated by a user.

In the withdrawal line 5 situated in the withdrawal direction downstream of the mechanic economizer 6, there is present liquid or gaseous cryogenic fluid. In order to manually close the withdrawal line 5 in the case of an emergency, there is arranged downstream of the economizer 6 a manually actuatable hand valve 11. This may usually be accessed next to a filling coupling of the cryogenic container 2.

In the withdrawal line downstream of the manually actuatable hand valve 11, there is provided a currentless closed valve 12, which is connected via a control line to an ignition of the motor M of the vehicle. In this way, this valve 12 is usually closed if the motor M is not running.

Figure 2:
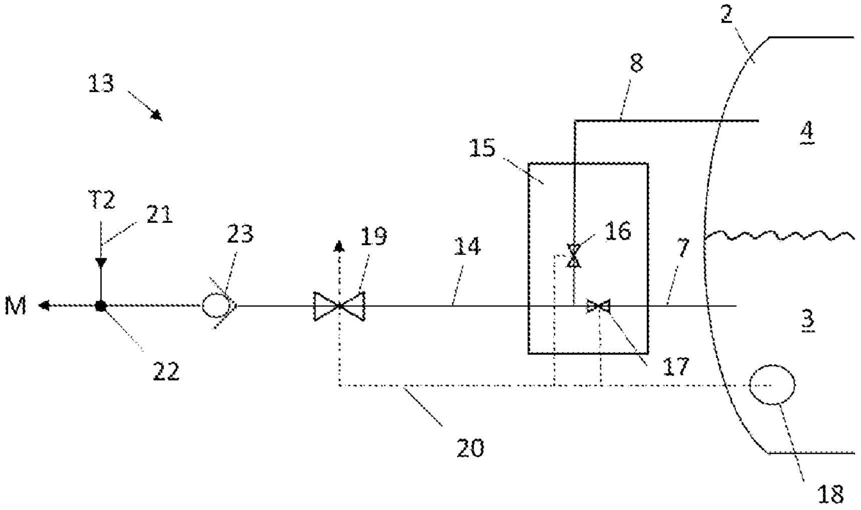
FIG. 2 shows an inventive safety withdrawal system for a cryogenic container.

FIG. 2 shows an inventive safety withdrawal system 13. The cryogenic container 2 is herein configured essentially as in the embodiment of FIG. 1 and stores cryogenic fluid in liquid phase 3 and gas phase 3, which may be withdrawn from the cryogenic container 2 via connection lines 7 or 8, respectively. The cryogenic container 2 and the safety withdrawal system 13 have the same purpose as described for FIG. 1 such that also this cryogenic container 2 may serve as a fuel tank for a vehicle by the cryogenic fluid stored in the cryogenic container 2 being supplied to a motor M.

Cryogenic fluid is withdrawn from the cryogenic container 2 of FIG. 2 via a withdrawal line 14, wherein there is arranged an economizer 15 between the cryogenic container 2 and the withdrawal line 14, which is configured, in contrast to the embodiment of FIG. 1, as an electric economizer 15. The electric economizer 15 has a currentless closed first valve 16 within the connection line 7 for withdrawing cryogenic fluid in liquid phase 3 and a currentless closed second valve 17 in the connection line 8 for withdrawing cryogenic fluid in gas phase 4.

The two valves 16, 17 of the electric economizer 15 are connected, as known from prior art, to a control device, which determines, upon receiving measured values, an optimum ratio of liquid phase withdrawn to gas phase withdrawn and controls the valves 16, 17 to open or close these correspondingly. In addition, the valves 16, 17 are configured, however, to be currentless closed, having a further control input, via which these may be manually actuated via an emergency stop switch 18.

In this case, the manual blocking of the withdrawal line 14 may, hence, be realized via the emergency stop switch 18, which controls the electric economizer 15 using the currentless closed valves 16, 17 provided for this purpose. In this embodiment, the emergency stop switch 18 permanently sends a signal or signals, respectively, to the two valves 16, 17. If the emergency stop switch 18 is pushed, for example if a user detects an emergency, the signal sent by the emergency stop switch 18 to both valves 16, 17 will be cancelled such these are closed. A manually actuatable mechanic check valve or hand valve, respectively, within the withdrawal line 14 may be omitted herein.

In the withdrawal direction there is provided downstream of the electric economizer 15 optionally in the withdrawal line 14 further a currentless closed valve 19, which is controlled by a motor ignition. In contrast to the valve 12 of the embodiment of FIG. 1, this currentless closed valve 19 has two control inputs or one doubly assigned control input such that the valve 19 may be controlled, on the one side, by the motor ignition and, on the other side, manually via the emergency stop switch 18. The valve 19 is configured such that it is closed if a respective signal from the motor ignition or from the emergency stop switch 18 is cancelled.

The emergency stop switch 18 is, hence, preferably connected via signal lines 20 to the three currentless closed valves, namely to the two valves 16, 17 of the electric economizer and to the currentless closed valve 19 in the withdrawal line, which may also be controlled by the motor ignition. In general, if there is enabled or desired, respectively, the withdrawal of cryogenic fluid from the cryogenic container 2, then the emergency stop switch 18 will send signals to all three valves 16, 17, 19. If the emergency stop switch 18 is pushed, for example, if a user detects an emergency, then the signal sent by the emergency stop switch 18 to the valves 16, 17, 19 is cancelled such that those are closed. In this way, there may be created a redundant emergency stop system of a high safety level even without manually actuatable hand valve 11 as in the embodiment of FIG. 1. The withdrawal line 14 or the entire safety withdrawal system 13, respectively, thus have no manually actuatable hand valve at any point.

It is to be noted that the currentless closed valves 16, 17, 19 are equipped with a special logics. The valves 16, 17 of the electric economizer 15 are always closed if there is not present a signal from the emergency stop switch 18. If there is, however, applied a signal from the emergency stop switch 18 onto the valves 16, 17, these may be closed or open, depending on the control by the control device of the electric economizer. The valve 19 will only be opened if there is applied a signal from the emergency stop switch 18 as well as from the motor ignition thereon. If one of the two signals or both signals are not present at the valve 19, then the valve 19 is closed.

The emergency stop switch 18 may be arranged immediately at the cryogenic container 2, i.e. thereon. In other embodiments the emergency stop switch 18 may be arranged immediately next to a filling coupling, a pressure indicator or any other location such as a driver's cabin. Further, there may be provided a further emergency stop switch, which is also connected to the currentless closed valves 16, 17, 19, optionally via a further control input. In this case, the valves 16, 17, 19 are closed anyway if a signal of the emergency stop switch 18 or a signal of the further emergency stop switch is cancelled. The further emergency stop switch may be arranged in a driver's cabin, for example.

In some cases there may be provided that there is provided, in addition to the depicted cryogenic container 2, another cryogenic container T2 to supply the motor M with cryogenic fluid as fuel. In a practical application, there is stored, for example, a first cryogenic container 2 on the left side of a vehicle and a second cryogenic container T2 on the right side of a vehicle. In general, the withdrawal lines of the two cryogenic containers 2, T2 are combined upstream of the motor M, as depicted in FIG. 2 by way of the connection line 2, which may be realized, for example, by the withdrawal line of the second cryogenic container T2. Hence, there is present within the withdrawal line 14 of the first (depicted) cryogenic container 2 a node 22, in which the part of the withdrawal 14 facing the cryogenic container 2 and having the connection line 21 to the second cryogenic container T2 coincides with the part of the withdrawal line 14, which faces the motor M.

If the first cryogenic container 2 is to be decoupled by the emergency stop switch 18 from the withdrawal system, then, following an initial pressure drop in the cryogenic container 2, there will be present a differential pressure at the currentless closed valve 19 or in case of the failure thereof at the valves 16, 17, respectively, wherein the pressure on the side of the motor M is higher than on the side of the cryogenic container 2, i.e. a negative differential pressure in regard to the withdrawal direction. For the currentless closed valve 19 this will not be a problem in general as it will block the withdrawal line 14 irrespective of the direction. For the currentless closed valves 16, 17 of the electric economizer 15 such a negative differential pressure may, however, lead to problems as these are configured, as described above, in some embodiments as differential pressure valves or pressure relief valves, respectively, in regard to the atmospheric pressure. In the case of a problem, if the valve 19 fails, then this may result in an excessively high negative differential pressure being present at the currentless closed valves 16, 17 of the electric economizer 15 such that these may be forced open from the side of the motor and then fail.

In order to create complete redundancy, there is thus provided downstream of the electric economizer 15 and upstream of the node 22, i.e. between the node 22 and the currentless closed valve 19 or between the electric economizer 15 and the currentless closed valve 19, a check valve 23, which prevents the flow of cryogenic fluid in the direction of the cryogenic container 2.

Irrespective of the solution mentioned above, it is possible that there are provided two cryogenic containers 2, T2, and for each of the cryogenic containers 2, T2 there is provided a respective safety withdrawal system 13, which each has, as discussed above, connection lines 7 or 8, a withdrawal line 14, an economizer having currentless closed valves 16, 17 in the connection lines 7 or 8 and optionally a currentless closed valve 19 in the withdrawal line 14. The withdrawal lines 14 of the two safety withdrawal systems 13 may be connected via a connection line 21, wherein this is not compulsory, and the withdrawal lines 14 could, for example, also lead to various motors. Basically, however, there could be provided an emergency stop switch 18 for one of the safety withdrawal systems 13 and a further emergency stop switch 18 for the other of the safety withdrawal systems 13. There is, however, preferred that a single emergency stop switch 18 be provided, which is connected to the two currentless closed valves 16, 17 of both electric economizers 15 (i.e. in total to four economizer valves 16, 17) and configured to block the withdrawal of cryogenic fluid by all four valves 16, 17 simultaneously upon actuation. This emergency stop switch 18 could also be connected to the currentless closed valves 19 in the withdrawal line 14 and close these upon actuation. The emergency stop switch is usually accessible at a vehicle side. In this way, in such a system the withdrawal of cryogenic fluid from both cryogenic containers may be stopped from both sides of the vehicle, there may be provided two such emergency stop switches 18, wherein the emergency stop switches 18 are each arranged at different sides of the vehicle.

Alternatively or additionally to the embodiments mentioned above, the emergency stop switch 18 could not be actuated or not only manually actuated, but could rather also be actuated by a control unit of the safety withdrawal system 13, which is configured to actuate the emergency stop switch 18 in the case of an accident and, in this way, simultaneously close in the case of an emergency the valves 16, 17 of the electric economizer 15 and optionally also the currentless closed valve 19. The emergency stop switch 18 could be immediately integrated within the control unit, for example. The emergency stop switch 18 may, for example, be manually actuated and also by the control unit in the case of an accident. Equally, there could be provided also two emergency stop switches 18, wherein one may be manually actuated and the other by a control unit, which controls the emergency stop switch 18 in the case of an accident. For the detection of an accident, the control unit could be connected to an electronics of the vehicle or to a sensor such as an acceleration sensor (which could indicate a collision), a temperature sensor for the detection of am ambient temperature (which could indicate a fire) or a pressure sensor for the detection of an internal pressure of the cryogenic container (which could indicate a malfunction of the cryogenic container), wherein a value measured above or under a threshold value of the respective sensor will indicate an accident. In the case of two emergency stop switches 18, the valves 16, 17, 19 could, for example, have an additional control input for the additional emergency stop switch 18.

In the embodiments mentioned above, the control unit could further be configured to detect an operational mode of a vehicle and enable the withdrawal of cryogenic fluid only if the vehicle is in operation. In other words, the control unit will clear the passage of cryogenic fluid through the economizer or through the withdrawal line, respectively, only if the proper data on the operational state (i.e. motor temperature) are received, for example, by a vehicle electronics or by separate sensors. By way of this circuit, there would be possible a dual protection of the two withdrawal paths (one the one side, the valves 16 and 19 for gas and, on the other side, the valves 17 and 19 for liquid). This may be desired to fulfil the special safety requirements for, e.g., hydrogen.

In particular embodiments the check valve 23 could simply replace the manually actuatable mechanic hand valve 11 of FIG. 1 or could be used in addition thereto, wherein there is also not used an emergency stop switch 18 and the economizer could be configured as electric economizer 15 or electric economizer 6, as long as the valves thereof may be configured as pressure relief valves and may be forced open in the direction of the cryogenic container. This will also result in an increased safety or increase of space, respectively, as the hand valve 11 is omitted and without damage to the valves of the economizer and, hence, entry of cryogenic fluid into the cryogenic container 2 in the case of a problem. This variant thus relates to a safety withdrawal system, comprising a cryogenic container, a withdrawal line and an economizer situated between the withdrawal line and the cryogenic container for withdrawing cryogenic fluid in liquid phase and gas phase, wherein the economizer is configured to have two pressure relief valves, which each may block the withdrawal of the liquid phase or of the gas phase from the cryogenic container, wherein a check valve is situated downstream of the economizer in the withdrawal line.

The invention claimed is:

1. A safety withdrawal system, comprising a cryogenic container, a withdrawal line and an economizer situated between the withdrawal line and the cryogenic container for withdrawing cryogenic fluid in liquid phase and gas phase, wherein the economizer is configured as an electric economizer having two controllable and currentless closed valves, which each may block the withdrawal of the liquid phase or the gas phase from the cryogenic container, wherein the safety withdrawal system further comprises a control device for controlling the valves, wherein the safety withdrawal system further comprises an emergency stop switch, which is connected to the two currentless closed valves of the electric economizer and is configured to simultaneously block the withdrawal of cryogenic fluid by both valves upon actuation, and wherein the emergency stop switch is a manually actuatable emergency stop switch and/or wherein the safety withdrawal system further comprises a control unit connected to the emergency stop switch, which is configured to detect an accident and to actuate the emergency stop switch upon detection of an accident, wherein the valves are always closed if there is no signal present from the emergency stop switch and are each closed or open, depending on the control of the control device, when a signal of the emergency stop switch is applied onto the valves.

2. A safety withdrawal system according to claim 1, further comprising a currentless closed valve controlled by a motor ignition in the withdrawal line, wherein the emergency stop switch is connected to the currentless closed valve controlled by the motor ignition as well as to the two currentless closed valves of the electric economizer and is configured to simultaneously block, upon actuation, the withdrawal of cryogenic fluid by all three valves.

3. A safety withdrawal system according to claim 1, wherein the emergency stop switch is arranged at the cryogenic container or within a driver's cabin.

4. A safety withdrawal system according to claim 1, wherein the emergency stop switch is arranged immediately next to a filling coupling of the cryogenic container or a pressure indicator of the cryogenic container.

5. A safety withdrawal system according to claim 2, comprising a further emergency stop switch arranged within a driver's cabin, which is connected to the currentless closed valve controlled by the motor ignition and the two currentless closed valves of the electric economizer and which is configured to block the withdrawal by all three valves upon actuation.

6. A safety withdrawal system according to claim 2, comprising a connection line to a further cryogenic container, which connects at the withdrawal line downstream of the currentless closed valve controlled by the motor ignition in a node, and a check valve, which is arranged downstream of the electric economizer and upstream of the node and prevents a flow of cryogenic fluid in the direction of the cryogenic container.

7. A safety withdrawal system according to claim 1, wherein the control unit is configured to detect an accident by receiving a respective control signal of a vehicle electronics and/or by receiving a respective sensor signal of a sensor connected to the control unit.

8. A safety withdrawal system according to claim 7, wherein the sensor is an acceleration sensor, a temperature sensor for determining the ambient temperature or a pressure sensor for determining an internal pressure of the cryogenic container and an accident will be detected if a value measured by the sensor exceeds a predetermined threshold or drops below it.

9. A safety withdrawal system according to claim 1, wherein the control unit is further configured to detect an operational mode of a vehicle and to enable the withdrawal of cryogenic fluid only if the vehicle is in operation and/or if a safe and secure withdrawal of cryogenic fluid is being ensured.

10. A safety withdrawal system according to claim 1, comprising a further cryogenic container, a further withdrawal line and a further electric economizer arranged between the further withdrawal line and the further cryogenic container and having two controllable and currentless closed further valves, wherein the emergency stop switch is connected to the two valves of the economizer as well as the two further valves of the further economizer and is configured to simultaneously block the withdrawal of cryogenic fluid by all four valves of the two economizers upon actuation.

11. A safety withdrawal system according to claim 10, further comprising valves controlled by a motor ignition and currentless closed within the withdrawal line and within the further withdrawal line, wherein the emergency stop switch is connected to the valves controlled by the motor ignition as well as to the four currentless closed valves of the electric economizer and is configured to simultaneously block the withdrawal of cryogenic fluid by all six valves upon actuation.

12. A safety withdrawal system, comprising a cryogenic container, a withdrawal line and an economizer situated between the withdrawal line and the cryogenic container for withdrawing cryogenic fluid in liquid phase and gas phase, wherein the economizer is configured as an electric economizer having two controllable and currentless closed valves, which each may block the withdrawal of the liquid phase or the gas phase from the cryogenic container, wherein the safety withdrawal system further comprises an emergency stop switch, which is connected to the two currentless closed valves of the electric economizer and is configured to simultaneously block the withdrawal of cryogenic fluid by both valves upon actuation, and wherein the emergency stop switch is a manually actuatable emergency stop switch and/or wherein the safety withdrawal system further comprises a control unit connected to the emergency stop switch, which is configured to detect an accident and to actuate the emergency stop switch upon detection of an accident, further comprising a currentless closed valve controlled by a motor ignition in the withdrawal line, wherein the emergency stop switch is connected to the currentless closed valve controlled by the motor ignition as well as to the two currentless closed valves of the electric economizer and is configured to simultaneously block, upon actuation, the withdrawal of cryogenic fluid by all three valves.

* * * * *